2,950,262

Patented Aug. 23, 1960

2,950,262

PREPARATION OF FOAMED POLYURETHANE USING SALT OF MANNICH BASE AS CATALYST

David C. Bush, Boise, Idaho, and Earl E. Parker, Allison Park, Pa., assignors to Pittsburgh Plate Glass Company, Allegheny County, Pa.

No Drawing. Filed Aug. 3, 1955, Ser. No. 526,311

2 Claims. (Cl. 260—2.5)

This invention relates to the curing of resinifiable materials and it has particular relation to the curing of foamable mixtures of (A) alkyd resins containing available hydroxyls and (B) diisocyanates.

Heretofore it has been noted that alkyd resins and notably those comprising polyester chains of non-ethylenic dibasic acids and polyhydric alcohols containing hydroxyls at appropriate points in the polyester chain can be reacted with a diisocyanate to effect cross-linking between contiguous polyester molecules at points of hydroxylation. The polyester is thus transformed into a thermoset, urethane resin. If the reaction is conducted in the presence of water (either free or latent, as for instance in a hydrated salt) a part of the diisocyanate will also react to liberate gas (carbon dioxide) which under appropriate conditions, converts the mixture to a foam that ultimately sets to a solid state.

The foregoing reactions are usually conducted in the presence of a catalyst, of which, tertiary amines such as N-methyl morpholine, are outstanding examples. The foregoing reaction between the polyester and the diisocyanate, in the presence of a catalyst, is initiated very quickly and proceeds with such dispatch that considerable difficulty has been experienced in attaining complete mixture of the several components before the reaction has proceeded so far as to preclude proper mixing. This was especially true in the instance of the foam resins prepared by reacting the polyester and the diisocyanate in the presence of water.

This invention is based upon the discovery that the foregoing difficulties can be overcome by adding to the reaction mixture of polyester and diisocyanate a decomposable ammonium salt of a Mannich base, and notably a quaternary ammonium salt which per se, has but little or no catalytic effect, but in the mixture, is adapted to decompose to liberate a tertiary amine constituting a true catalyst of the reaction. By use of such compound, the initiation of the reaction is sufficiently delayed to permit complete mixing of the several reaction components before substantial gelation can occur. When the thoroughly mixed components react in accordance with the provisions of the present invention, the resultant foams are of exceptionally fine and uniform cell structure.

One appropriate class of salts comprises the quaternary ammonium compounds derived from Mannich bases. The Mannich bases may be prepared by reacting a ketone, such as cyclohexanone, with formaldehyde and a secondary amine in accordance with the equation:

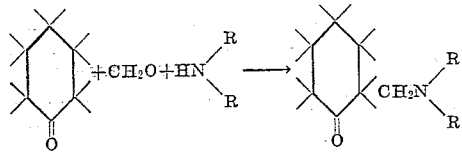

The Mannich base is then converted into a quaternary ammonium salt by reaction with an organic halide such as methyl iodide in accordance with the equation:

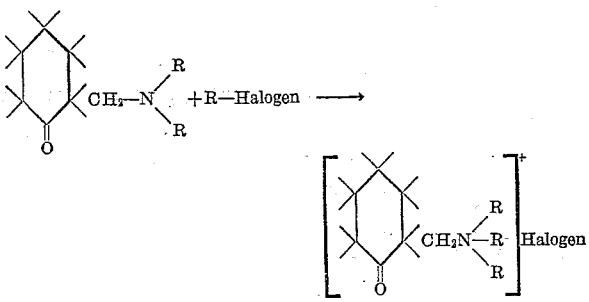

The quarternary ammonium salt of a Mannich base can be added as a delayed action catalyst to a mixture of a polyester, a diisocyanate and water (preferably as a hydrated salt) where it decomposes in accordance with the equation:

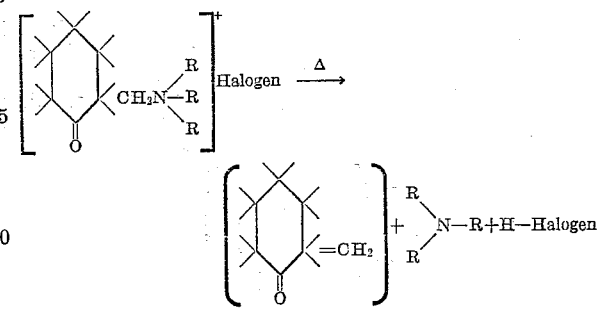

The tertiary amine when released effectively catalyzes the reaction to provide an excellent foam.

Useful Mannich base derivatives may be obtained by reacting cyclohexanone, paraformaldehyde, and dimethyl amine in the presence of hydrochloric acid. The product of the latter reaction may be further reacted with benzyl chloride or with methyl iodide. A still further useful Mannich base compound may be prepared by reacting dimethyl ketone with paraformaldehyde and morpholine, and then reacting the product with methyl iodide. The paraformaldehyde reacts like formaldehyde to provide the methylene group in the Mannich base. All of the foregoing materials constitute ammonium salt derivatives in which four valences of the nitrogen are linked to organic radicals. They may all be incorporated as delayed action catalysts with mixtures of polyesters and diisocyanates in accordance with the provisions of the present invention.

The quaternary ammonium salts from Mannich bases preferably are relatively soluble in the polyester-diisocyanate mixture and in the amounts employed, all or most of a given quaternary ammonium compound will dissolve in the mixture. They should be susceptible of decomposition to provide a tertiary amine at a temperature which is within the range of reaction of the diisocyanate and the polyester. They are especially useful in the polyesters of relatively low acid number, e.g. about 12 or 15, or preferably below, e.g. down to 1, or as much below as is attainable.

The quaternary ammonium salts of Mannich bases disclosed herein are well adapted for use in polyester-diisocyanate mixtures containing emulsifying agents as hereinafter described.

Polyesters suitable for mixing with diisocyanates and quaternary ammonium salts of Mannich bases as catalysts, in accordance with the provisions of the present invention, preferably are of relatively low acid number and substantial hydroxyl value. Probably the acid number should not much exceed 60 and may be as low as is practicable to obtain, for example, 1 or below. The hydroxyl value preferably is in a range of about 20 to 500 or 700. If the polyesters are to be used in the preparation of flexible foams, the hydroxyl value may be in the lower portions of the range, e.g. about 60 to 80 or 100. In the preparation of rigid foams, it is preferable that the hydroxyl value be in the higher portions of the range, e.g. from about 300 to 500 or 600. The products from polyesters in the intermediate range may be of intermediate flexibility. In the polyester the hydroxyl to carboxyl ratio should be at least 5 to 1.

The polyesters should be at least viscously liquid or they should be susceptible of being rendered liquid by application of heat. Such polyesters may be prepared by condensation of a dicarboxylic acid and a polyhydric alcohol, such as one of the glycols or preferably a mixture of a glycol and an alcohol containing 3 or more hydroxyls, such as glycerol, pentaerythritol or the like.

Appropriate acids for use in the preparation of the polyesters comprise aryl dicarboxylic acids, such as phthalic acid, terephthalic acid, or isophthalic acid, or their homologues and chloro derivatives, where substitution, if any, involves one or more of the positions in the ring. Still other acids, such as those containing aliphatic chains interconnecting the carboxyls, are admissible and are represented by succinic acid, adipic acid, sebacic acid, azelaic acid, and others containing up to about 10 carbon atoms. Blends of the latter type of acid, with each other or with aryl dicarboxylic acids in equal molar proportions or in other ratios are also included within the scope of the invention. It is to be recognized that the term dicarboxylic acid also includes the anhydrides of the acids since the anhydrides form the same esters as the free acids and in many instances it is preferable to work with the anhydride rather than the acid.

At least a portion of the saturated acids in the polyesters may be replaced by acids containing alpha ethylenic unsaturation. These are represented by maleic acid and itaconic acid. Preferably, these acids are reacted with dihydric alcohols of fairly long chain length and being represented by triethylene glycol or tetraethylene glycol.

Usually the polyesters will include as the polyhydric alcohol a substantial amount of a dihydric alcohol such as ethylene glycol, propylene glycol, diethylene glycol, dipropylene glycol, trimethylene glycol, and in some instances poyethylene glycol such as is sold on the market under the familiar trade name of Carbowax. Blends of two or more of the dihydric alcohols are included within the purview of the invention. Polyhydric alcohols include glycerol, pentaerythritol, trimethylol ethane, trimethylol propane, mannitol, and others. In flexible foams, these usually are employed in lesser amount than the dihydric alcohol and are designed to provide free hydroxyls especially at intervals along the polyester chain. In rigid foams much higher ratios of polyhydric alcohol may be employed. Indeed the alcohol component may be exclusively polyhydric. Usually the polyhydric alcohol and dihydric alcohol are employed in a substantial excess, e.g. 5 to 20 percent excess over the total of the carboxyls available in the reaction mixture from which the polyester is derived.

The reaction of esterification between the polyhydric alcohol and the dibasic acid components of the mixture is conducted in accordance with the conventional procedures by heating a mixture, often in the presence of a diluent such as xylol at reflux conditions, to evolve and remove water. The reaction is continued until desired viscosity and acid are attained. Since the preparation of such polyesters is a well recognized art, elaboration upon the mode of conducting the esterification reaction is not deemed to be necessary.

Diisocyanates which may be interacted with polyesters, such as those above referred to, include chlorophenyl 2,4-diisocyanate, ethylene diisocyanate, 1,4-tetramethylene diisocyanate, p-phenylene diisocyanate, tolylene diisocyanate (mixed isomers), p'-diisocyanato diphenyl methane, hexamethylene diisocyanate and others. The tolylene diisocyanate mixed isomers, because of general availability and satisfactory operation in the process, are presently preferred, though of course, as commercial conditions change this preference is also subject to change.

Where foamed resins are to be prepared by the interaction of a polyester and a diisocyanate, water, in latent form, as for instance, in a hydrated salt, should be included in the reaction mixture. Any of the hydrated salts which liberate water at temperatures within a reasonable range may be employed. Appropriate salts comprise the heptahydrate of magnesium sulfate, or the trihydrate of sodium acetate, or Glauber's salt, or the heptahydrate of sodium sulfate. It is to be understood that the water reacts with the diisocyanate more or less competitively with respect to the cross-linking reaction and as a result, carbon dioxide is liberated. It is also to be understood that carboxyl groups in the polyester also react with diisocyanates under appropriate conditions to liberate carbon dioxide though in the present instance, this latter reaction appears to be of minor importance inasmuch as the available carboxyl content of the polyester is relatively low.

In order to provide foamed polyester-diisocyanate derivatives, it is usually preferable to incorporate with the mixture of the polyester and the diisocyanate an emulsifying agent which has a capacity of promoting emulsification or distribution of the diisocyanate and polyester as well as the other ingredients of the mixture. It would appear that the emulsifying agent also acts like soap in water in forming cells or bubbles in the liquid mixture. This latter action is especially desirable during the early stages of the reaction. As the reaction proceeds and the cross-linking between the diisocyanate and the polyester molecules competing with the decomposition to form gases, attains a sufficiently advanced stage, the resinifiable components thicken to a degree inherently to retain the gases. Ultimately, the resinifiable components attain a solid, thermoset state providing a permanent foam comprising a polyurethane resin which may be relatively rigid or flexible dependent upon the composition of the polyester.

Emulsifying agents which may be incorporated with the polyester-diisocyanate mixtures of the present invention comprise the well recognized anionic, cationic, or non-ionic wetting agents and detergents which are familiar to the art. A well recognized and familiar example of one such material sold commercially under the trade name of Emcol H-77 (sold by the Emulsol Corporation) is particularly effective in the process. This is a blend of polyalcohol carboxylic esters and oil soluble sulfonates. Other emulsifying agents comprise Emulphor ELA which is a condensation product of ethylene oxide and fatty acids free of soap. Still another emulsifying agent sold commercially as Tween-40 which is polyoxyethylene sorbitan monopalmitate. Tween-60 which is polyoxyethylene sorbitan monostearate should also be included in this group. It is to be understood that any other emulsifying agent conventionally employed in forming foams in systems comprising polyesters and diisocyanates may be employed with the quaternary ammonium compounds herein disclosed.

A generalized formulation of a composition suitable for forming foam resins in accordance with the provisions of the present invention is:

| | Parts by weight |
|---|---|
| Polyester | 100 |
| Emulsifier | 0.1–10 |
| Hydrated salt having a water equivalency of | 0.1–5 |
| Diisocyanate | 20–100 |
| Delayed action catalyst | 0.2–5.0 |

The polyester in the above formulation preferably is of an acid number of about 1 to 60, e.g. 2–15; a hydroxyl number of about 20 to 500 or 600; and a viscosity on the Gardner-Holdt scale at 100 percent solids of $Z_1$-$Z_6$, e.g. $Z_3$-$Z_5$.

It is to be recognized that the reaction herein disclosed will proceed at normal room temperature, but the reaction is exothermic in nature. It can, if desired, be promoted by the application of mild heat. It is often desirable, for example, to heat the foamable mixture in order to effect completion of the cross-linking action, to a temperature of about 100° C. to 200° C. for about a period of about 10 minutes to 2 hours. A good temperature range for the final reaction is 104° C. to 150° C. for about 30 minutes.

It is to be recognized that where the foregoing mixture is made up in accordance with this invention, with a delayed action catalyst, such as a quaternary ammonium salt of a Mannich base, that the liquid mixture can be throughly agitated in order to obtain uniform distribution of all components of the mixture without any undue tendency for the mixture to gel prematurely. The mixture can be poured out in molds or in other desired manner while still completely ungelled. However, ultimately, either as a result of exothermic rise or by reason of the application of external heat to the mixture, the catalyst becomes completely effective owing to the break down of the quaternary ammonium salts of Mannich bases constituting the catalyst, thus effectively catalyzing the reaction to produce a foam of fine minute cells of relatively high volume. The polyester-diisocyanate interpolymer is mechanically strong and chemically resistant.

The preparation of a polyester suitable for use in the practice of the invention is illustrated by the following examples:

Example A

This alkyd resin was prepared from a mixture comprising:

| | Moles |
|---|---|
| Adipic acid | 16 |
| Diethylene glycol | 18 |
| Glycerine | 1 |

Catalyst of esterification (toluene sulfonic acid), 0.1 percent based upon the mixture.

The mixture was reacted in accordance with conventional procedures to form a liquid resin having a hydroxyl value in a range of 60 to 80 and an acid number of 2 or less. The polyester is liquid in form. This polyester is of rather low hydroxyl value and often employed in forming more flexible foams.

Types of resins well adapted for the preparation of more rigid foams are such as the following:

Example B

The resinifiable mixture comprised:

| | Moles |
|---|---|
| Phthalic anhydride | 2 |
| Adipic acid | 10 |
| Trimethylol propane | 20 |

The mixture preferably is cooked to an acid value of about 1 and a hydroxyl value of about 450. The resin is liquid and the high hydroxyl value renders it especially useful in forming rigid foams.

Example C

The resinifiable mixture comprised:

| | Moles |
|---|---|
| Phthalic anhydride | 1 |
| Adipic acid | 5 |
| Glycerol | 8 |

The mixture preferably is cooked to an acid number of about 10. The polyester is of high hydroxyl value and is a liquid product well adapted for mixing with diisocyanates, emulsifying agents and delayed action catalysts as herein disclosed. The resin foams may be of the rigid type.

Example D

A polyester was prepared comprising:

| | Moles |
|---|---|
| Glycerol | 7.6 |
| Adipic acid | 5.0 |
| Phthalic anhydride | 1.0 |

The mixture was cooked to an acid value of 42-46, a hydroxyl number of 400 to 500 and a viscosity of 45,000 to 70,000 cps. It could be mixed with diisocyanates such as a mixture of tolylene diisocyanates, emulsifying agent, hydrated salt such as the decahydrate or heptahydrate of sodium sulfate and foamed.

Example E

A further liquid polyester comprising a fatty acid was prepared. The polyester contained:

| | Moles |
|---|---|
| Adipic acid | 4 |
| Phthalic anhydride | 1 |
| Oleic acid | 2 |
| Glycerol | 8 |

Foamable mixtures of the polyester may contain quaternary ammonium salts of Mannich bases as the catalyst as herein disclosed.

It is to be understood that the principles of the present invention may also be employed in forming rigid foams such as are often used in thermal insulation, as fillings for hollow metal airplane propellers and for various other purposes.

Some specific examples illustrating the use of delayed-action catalysts in preparing foams are as follows:

Example I

The foamable mixture of this example comprised:

| | Grams |
|---|---|
| Polyester (as per Example A) | 56 |
| Hydrating paste | 30 |
| Catalyst paste | 25 |
| Emulsifying agent (Emcol H-77 or Tween 40) | 2 |
| Toluene diisocyanate isomers | 25 |

The catalyst paste in this example comprised a 25 percent solution of a quaternary ammonium compound in the polyester of Example A. The quaternary ammonium compound comprised as its basic component a Mannich base derived from cyclohexanone, paraformaldehyde and dimethyl amine. This base was reacted with methyl iodide to form the desired quaternary ammonium compound. The foamable mixture was well stirred. Foaming occurred in about 5 minutes, but the mixture was allowed to stand for 1 hour and was heated for an additional hour at 220° F. The foam time for the mixture was 5 minutes. The product had a density of 4.74 pounds per cubic foot and had an excellent foam structure. In the above mixture, the hydrating paste comprised sodium acetate trihydrate as a 20 percent mixture in a polyester which is of the composition outlined in Example A.

Example II

In this example, the polyester was substantially the same as in Example A. Magnesium sulfate heptahydrate was made up as a 20 percent paste in a portion of the polyester. Emcol H-77 was employed as an emulsifying agent. The delayed-action catalyst was the Mannich base derivative prepared by reacting the Mannich base of cyclohexanone, paraformaldehyde and dimethyl amine with benzyl chloride. The foamable mixture comprised:

| | Grams |
|---|---|
| Magnesium sulfate paste | 75 |
| Polyester (as in Example A) | 40 |
| Emcol H-77 | 2.3 |
| Catalyst | 5 |
| Toluene diisocyanate | 25 |

These several constituents were thoroughly mixed and allowed to stand at room temperature until foaming occurred. The mixture was then post-cured for 1 hour at 220° F. The product was a good and useful foam of a weight of 5.72 pounds per cubic foot. The foam time was 199 seconds.

Most of the foregoing resins are relatively flexible in character. More rigid types may be prepared in similar manner. Preferably, the polyesters employed in preparing rigid foams are of higher hydroxyl value. Rigidity may also be increased by increasing the diisocyanate content.

The examples of the invention as given are by way of illustration rather than limitation. Numerous modifications may be made therein without departure from the spirit of the invention or the scope of the appended claims.

We claim:

1. The method of effecting a reaction to form a foamed polyurethane resin of a mixture comprising 100 parts by weight of a polyester of a dicarboxylic acid and a polyhydric alcohol, about 20 to about 100 parts by weight of an organic diisocyanate, about 0.1 to about 5 parts by weight of water as water of crystallization in a compound which is selected from the group consisting of magnesium sulfate heptahydrate, Glauber's salt, sodium sulfate heptahydrate and sodium acetate trihydrate, and about 0.2 to about 5 parts by weight of the ammonium salt of the formula:

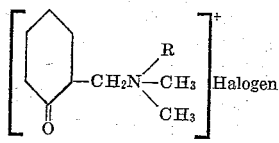

where R is a radical selected from the group consisting of methyl and benzyl, and maintaining the mixture at a temperature in a range extending from room temperature to about 200° C., until foaming and curing of the mixture is attained.

2. The method of effecting a reaction to form a foamed polyurethane resin of a mixture comprising 100 parts by weight of a polyester of a dicarboxylic acid and a polyhydric alcohol, about 20 to about 100 parts by weight of an organic diisocyanate, about 0.1 to about 5 parts by weight of water as water of crystallization in sodium acetate trihydrate, and about 0.2 to about 5 parts by weight of the ammonium salt of the formula:

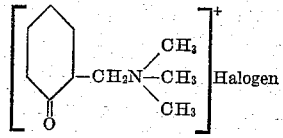

and maintaining the mixture at a temperature in a range extending from room temperature to about 200 C., until foaming and curing of the mixture is attained.

References Cited in the file of this patent

UNITED STATES PATENTS

| | | |
|---|---|---|
| 2,577,279 | Simon et al. | Dec. 4, 1951 |
| 2,634,244 | Simon et al. | Apr. 7, 1953 |
| 2,650,212 | Windemuth | Aug. 25, 1953 |
| 2,779,689 | Reis | Jan. 29, 1957 |
| 2,842,506 | Roussel | July 8, 1958 |

OTHER REFERENCES

Noller: Chemistry of Organic Compounds, pages 236 and 237, copyright 1951.

Fieser & Fieser: "Organic Chemistry," 2nd edition; copyright 1950, page 231.

Noller: "Chemistry of Organic Compounds," copyright 1950, page 230.

UNITED STATES PATENT OFFICE
CERTIFICATE OF CORRECTION

Patent No. 2,950,262                        August 23, 1960

David C. Bush et al.

It is hereby certified that error appears in the above numbered patent requiring correction and that the said Letters Patent should read as corrected below.

Column 3, line 60, for "5 to 20" read -- 5 to 200 --.

Signed and sealed this 3rd day of October 1961.

(SEAL)
Attest:

ERNEST W. SWIDER
Attesting Officer

DAVID L. LADD
Commissioner of Patents
USCOMM-DC